July 16, 1968    R. E. FULTZ ET AL    3,393,258
METHOD OF MOLDING UNITARY FOAM RUBBER ARTICLES
Filed Oct. 23, 1963    3 Sheets-Sheet 2
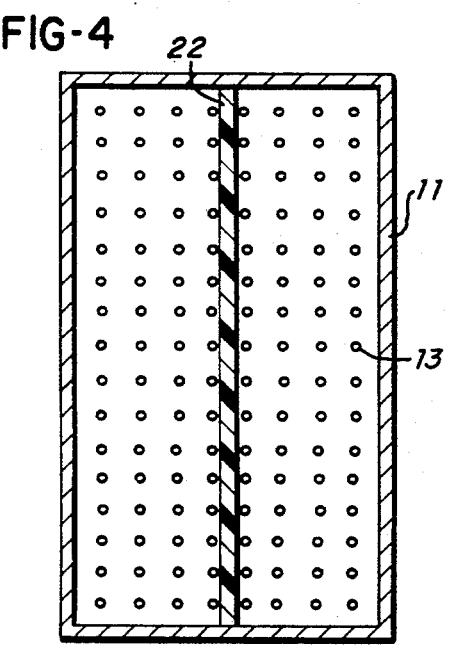
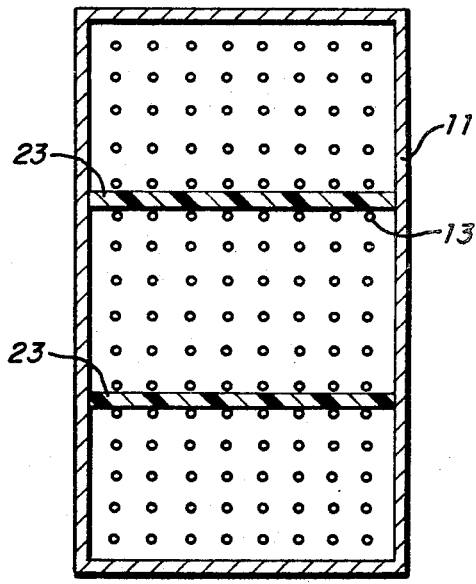
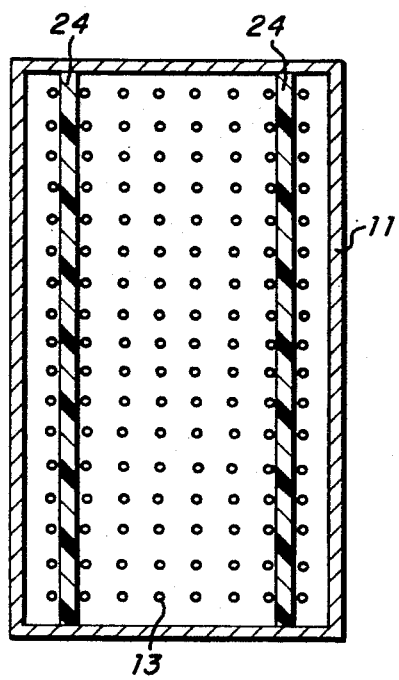
INVENTOR.
RUSSELL E. FULTZ
REUBEN WOLK
BY
Reuben Wolk
ATTORNEY July 16, 1968     R. E. FULTZ ET AL     3,393,258
METHOD OF MOLDING UNITARY FOAM RUBBER ARTICLES
Filed Oct. 23, 1963     3 Sheets-Sheet 3
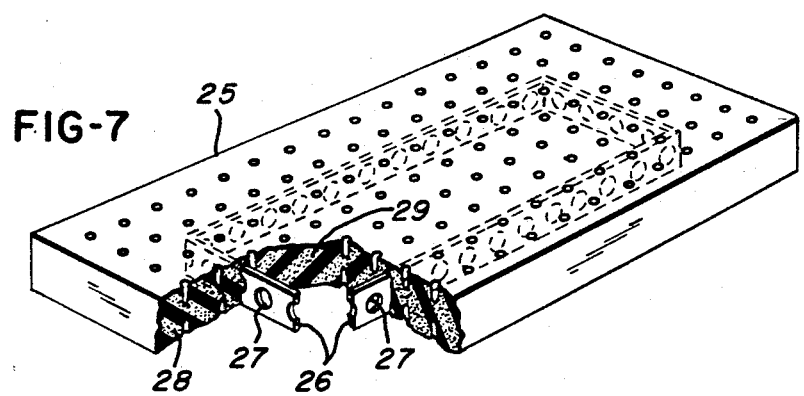
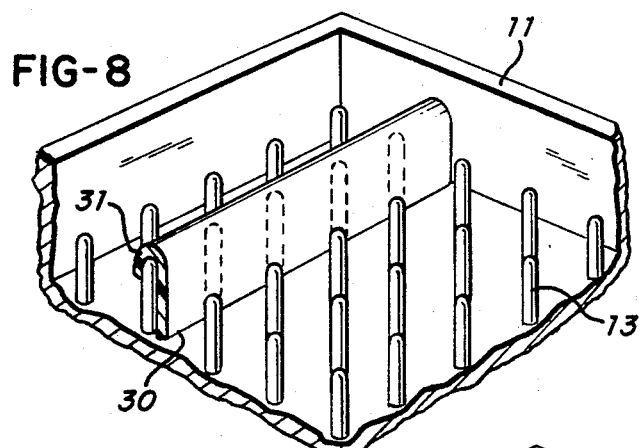
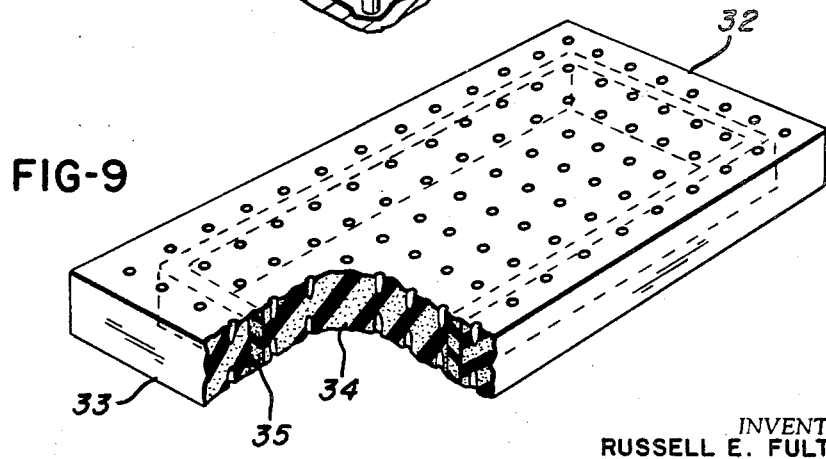
INVENTORS
RUSSELL E. FULTZ
REUBEN WOLK
BY
Reuben Wolk
ATTORNEY United States Patent Office 3,393,258
Patented July 16, 1968

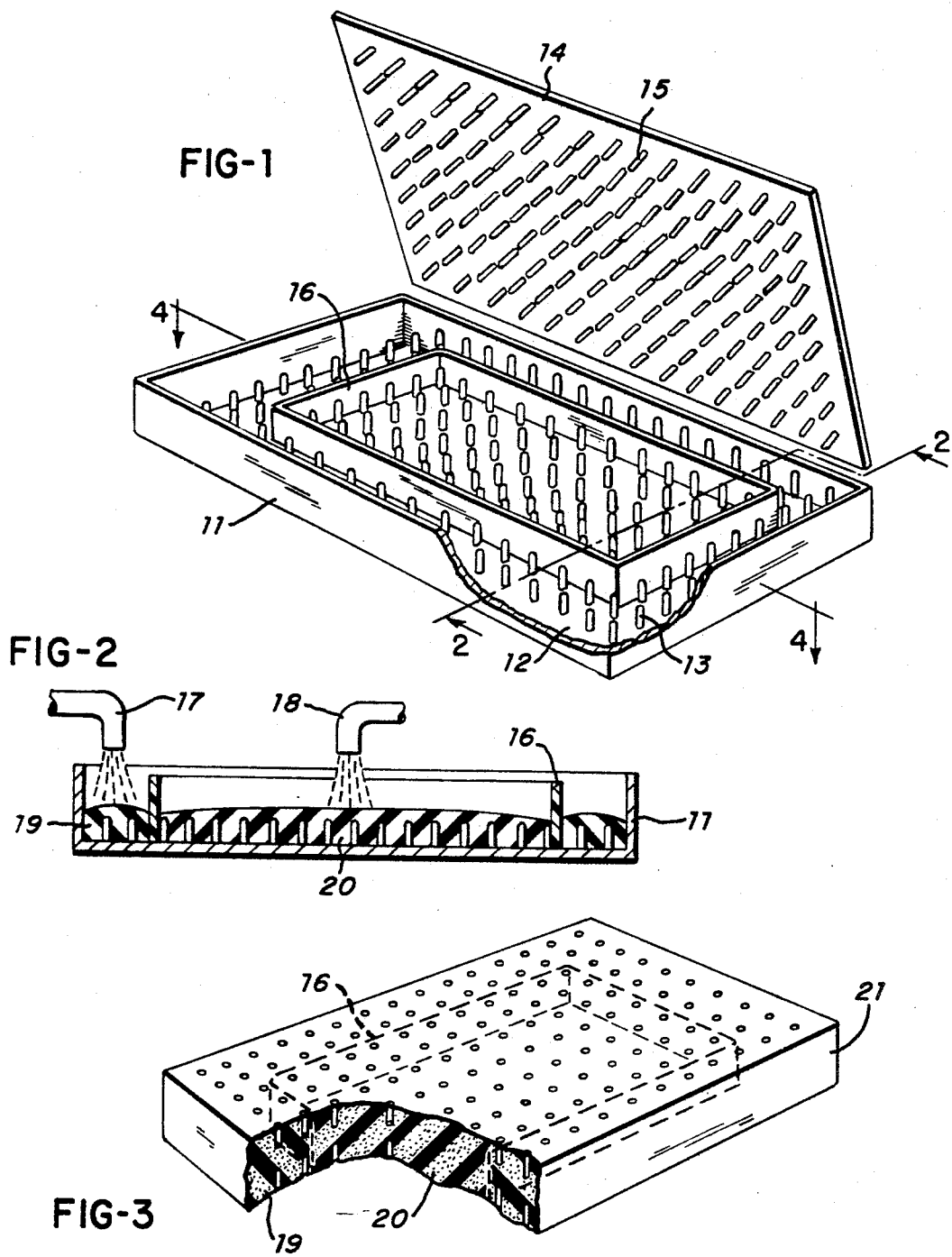

3,393,258
METHOD OF MOLDING UNITARY FOAM
RUBBER ARTICLES
Russell E. Fultz, Lake Junaluska, N.C., and Reuben Wolk, Dayton, Ohio, assignors to Dayco Corporation, a corporation of Delaware
Filed Oct. 23, 1963, Ser. No. 318,364
4 Claims. (Cl. 264—45)

ABSTRACT OF THE DISCLOSURE

A method of manufacturing foam rubber articles by placing strips of cellular elastomeric material in selected areas and introducing dissimilar latices within the areas defined by these strips. The latices are vulcanized with the strips in place to provide a unitary product having areas with different characteristics.

---

The invention relates to a method of manufacturing unitary foam rubber articles, and more particularly to such articles as mattresses, pillows, furniture cushions, automobile seat cushions, and the like.

Articles of this nature are normally manufactured by the use of metal molds having upper and lower mold members, the lower member having a cavity in which the mold is partially filled with a liquid rubber latex composition that is foamable; that is, has been compounded to permit foaming. The foamed material is subsequently coagulated and vulcanized as more fully described in United States Patent No. 2,432,353, one of the series of patents which describes the so-called Talalay process. The mold cavity and upper mold member contain a number of core pins which project into the pin cavity so that the resultant product has a number of corings extending inwardly from both surfaces.

At the present time the above-described process utilizes a latex composition which is uniform so that the resultant product is uniform in density throughout. In many instances, however, it has been found desirable to provide a product which has dissimilar densities in various portions thereof. While such a process and product have been known in the past, it has only been accomplished by fabricating two dissimilar members and cementing them together as described, for example, in United States Patent No. 2,612,158. Such a method of fabrication has proved unsatisfactory, however, because of the extra time, expense and labor involved.

It is, therefore, a primary object of this invention to provide a method for the manufacture of cushioning members which are unitary, yet contain material of dissimilar density in various portions thereof.

It is a further object to provide a method for manufacturing such products by inexpensive methods.

In the practice of this invention the conventional Talalay process, as described in the aforesaid Patent No. 2,432,353, may be employed. However, applicants have conceived the idea of locating an impervious strip of material within selected segments of the mold cavity to form a barrier strip. This permits two or more latices of dissimilar densities to be introduced into the various portions of the cavity which are defined by this strip. Because of the foamable nature of this material, the individual latices will foam within the respective portions of the mold cavity and will maintain their separate identities during the process. During the vulcanization the separate identity of the resulting foamed segments will also be maintained; the barrier strip may be removed or allowed to remain in place according to its nature and composition. The mating edges of the foam segments will then merge to form a unitary product. The invention will be more fully described in the following description and accompanying drawings, in which:

FIGURE 1 is a perspective view of a typical mold illustrating a barrier strip in position.

FIGURE 2 is a sectional view taken along lines 2—2 of FIGURE 1.

FIGURE 3 is a perspective view of a finished product manufactured in accordance with the present invention.

FIGURE 4 is a sectional view illustrating a modified form of the invention, the section being taken along lines 4—4 of FIGURE 1.

FIGURES 5 and 6 are views similar to FIGURE 4 illustrating further modifications of the invention.

FIGURES 7, 8 and 9 are perspective views illustrating further forms of the invention.

Referring now to the drawings, FIGURE 1 illustrates a mold comprising upper and lower mold members. The lower mold member 11 has a mold cavity 12 in which are mounted a plurality of core pins 13. The upper mold member 14 also has core pins 15 mounted therein and is adapted to be closed on the mold half 11 in order to provide a completely enclosed mold during the process of fabrication. A barrier strip 16 is mounted in the mold cavity by placing it between adjacent pins as illustrated. As shown in FIGURE 1, this strip is parallel to the outer peripheral portion of the mold cavity and thus defines an outer peripheral portion of the cavity which is separate from the remaining portion thereof. This strip is placed on the bottom of the mold cavity, as illustrated in FIGURE 2, and the upper edge, therefore, is somewhat short of the top edge of the lower mold half. The barrier strip is made of an impervious polymeric material such as polyethylene, polyvinyl chloride, polystyrene, and similar materials falling within this category; or it may be made of metals such as aluminum, steel or magnesium; or wood, cardboard or heavy paper.

When it is desired to fabricate the finished product, nozzles 17 and 18 are used to introduce liquid rubber latex into the various portions of the mold. As is shown in FIGURE 2, the nozzle 17 provides a latex 19 of one density, preferably about 0.35 gram per cubic centimeter which provides a comparatively firm foam member. The nozzle 18 introduces the latex 20 into the central or remaining portion of the mold cavity; this latex has a density of approximately 0.2 gram per cubic centimeter and provides a comparatively soft foam material. The latices are kept apart by the barrier strip 16, the top of the mold 14 is closed, and the subsequent process as described in the aforesaid Patent No. 2,432,353 will ensue. The latices will foam to form the typical stereoreticulate structure while maintaining their distinct identities. As further processing continues, the foaming is completed, and the resultant product is subsequently vulcanized. The product is removed from the mold and the strip is removed from within the body by pulling it out of the bottom. If necessary, this step may be facilitated by precoating the strip with surface repellant material such as silicone or polytetrafluoroethylene resins. Removal of the strip leaves a slit in the body (as indicated by dotted lines in FIGURE 3), and the edges of this slit are cemented together with suitable adhesive to form a unitary product. The resultant article, as illustrated in FIGURE 3, will consist of molded foam rubber segments of dissimilar densities which are mated at their edges by cementing or by contact during foaming (above the strip). The peripheral edge of the product is firm, and the remaining main portion is comparatively soft. Such a product has a high degree of utility because the firm edge tends to maintain the original shape of the article, and in the case of a mattress would reduce any tendency of the sleeper to roll off.

A modified form of the invention is illustrated in FIG-

URE 4 in which the same mold member 11 is provided with a strip 22 extending along the longitudinal center line of the mold cavity instead of peripherally as shown in FIGURES 1–3. This strip is made of the same material as the strip 16. A different latex is poured into each half of the mold cavity as defined by the strip 22. As the foaming process takes place in the manner previously described, a product results in which each half has a different density, one of which is firmer than the other. Preferable densities of the two halves are 0.09 gram per cubic centimeter and 0.06 gram per cubic centimeter. In the final product the strip 22 is also removed, and the two halves of the finished article will be cemented where the strip was removed, or merge in the areas above the strip. The result is a unitary member similar to the one described above. A finished product manufactured in this manner will have utility in a mattress, for example, because it provides soft and firm halves in accordance with the preferences of the users.

A further form of the invention is illustrated in FIGURE 5 in which the mold half 11 has a pair of strips 23 located transversely of the mold cavity dividing it into approximately three equal portions. The strips 23 are made of the same material as described with reference to strip 16. The processing will take place exactly as described above in which the latex having a firmer density will be supplied in the central portion of the mold cavity as defined by the strips 23, while the latex of softer density will be introduced into the end portions. After vulcanizing, the strips 23 are removed and the resulting slit cemented together. As in the other modifications, the portions of the finished article will merge at their edges above the strip during foaming. The result is a unitary product. By means of this process, a finished article, such as a mattress, is provided in which the central area is firmer in order to accommodate the maximum weight concentration of the sleeper, thus minimizing any tendency for the mattress to sag. The density of this section is also about 0.09 gram per cubic centimeter, while the softer end segments are approximately 0.06 gram per cubic centimeter.

FIGURE 6 illustrates still another form of the invention in which barrier strips 24, identical in composition to the strips 16, are placed within the mold cavity in a longitudinal direction to define two longitudinal edge portions and a central portion. The latex providing a firmer foam product is introduced into the edge portions, while a dissimilar latex is introduced into the central portion. After vulcanizing, the strips 24 are removed, and the edges of the resulting slit are cemented together while the remaining portions merge during foaming. The result is a unitary member. The finished product will be one in which the edges are firmer than the central portion, and thus in the case of a mattress will again prevent the tendency of the edges to be rounded or will prevent the sleeper from rolling off.

FIGURE 7 illustrates a further form of the invention in which the strip 26, which is of the same material as strip 16, is used in lieu of the strip 16. This strip is installed as in FIGURE 1, but instead of removing the strip 26, it is left in the finished product. It also may be desirable to improve the bond between the sections 28 and 29, and this may be accomplished by providing perforations 27 in the strip so that the latex, while foaming, will enter these perforations and create a locking effect. In the finished product illustrated in FIGURE 7 a molded article 25 is illustrated consisting of the outer peripheral portion 28 and the main portion 29. The strip 26 not only serves as a barrier between the different foam portions, but also provides a stiffening effect along the edges. The strip 26 may also be utilized in the configurations of FIGURES 4, 5 and 6 to provide a product having the desired characteristics discussed in connection with these figures. It should be understood that the strip 26 need not be perforated as shown, but may have a roughened surface or be otherwise treated to create a good bond.

When locating the strip, such as 26, within a mold, it is noted that the bottom half of this strip is flush with the bottom surface of the mold and may be exposed during the formation of the finished product, as can be seen in FIGURE 7. Under some circumstances it is important to eliminate this exposed edge, and this may be done by the method illustrated in FIGURE 8. It is noted that the strip 30, which is similar in composition to the strip 16, is provided with a hooked upper edge 31. This edge may be formed either by pinching the material with the fingers or by preforming such as in an extrusion press. This hooked edge may be placed over certain of the core pins as illustrated in FIGURE 8 so that the lower edges are kept free of the bottom of the mold cavity. The processing involving this strip is the same as described above, but the resultant product will not have the exposed lower edge. It should be understood that this strip 30 may also be located in any of the configurations shown in FIGURES 1–6.

FIGURE 9 illustrates a product manufactured by still another variation of the invention. In this figure the molded rubber article 32 which consists of an outer peripheral edge 33 and a main portion 34 also contains a strip 35 which has been vulcanized in place. The strip 35 may be placed in the mold as described with reference to FIGURE 1, but in this case consists of a strip of cellular elastomeric material such as foam rubber, urethane foam, vinyl foam, or the like. This strip 35 is sufficiently flexible to create a highly compatible member within the article, yet is sufficiently stiff to provide a certain amount of edge reinforcement for the article. As in the case of the other strips, it also serves as a barrier for the latices of dissimilar density and the inherent porosity of the structure creates an unusually good bond with the adjacent foam portions 33 and 34. This is due to the tendency of the liquid latices to partially flow into the internal foam structure of the strip. It should also be understood that the strip 35 may be located in any of the configurations shown in FIGURES 1–6.

Another variation of the invention involves the removable barrier strip described with reference to FIGURES 3–6. As stated above, the strip 16 was removed after vulcanization. It is also possible, however, to remove this strip immediately after introduction of the latices, then closing the mold and vulcanizing. The strip will serve to maintain identity of the latices during the initial pouring step, but the removal thereof will not affect this relationship.

Although the invention has been described with respect to certain forms of the invention, other modifications are possible within the scope of the invention. These configurations illustrate the basic principle of using barrier strips for separating the components of a unitary foam member, while in certain cases using these strips as reinforcements.

We claim:

1. The method of manufacturing molded unitary foam rubber articles having core pins mounted therein comprising the steps of placing a strip of material within certain segments of said mold cavity, forming a hooked upper edge in said strip, placing said edge over certain of said core pins, maintaining the lower edge of said strip free of the bottom of said mold cavity, introducing foamable rubber latex into one portion of said cavity as defined by said strip, introducing foamable rubber latex of a different density into the remaining portion of said cavity, vulcanizing said foamed latices into a unitary foam product and maintaining separate identity of said latices and the foamed portions resulting therefrom by means of said strip.

2. The method of manufacturing molded unitary foam rubber articles in a mold cavity having core pins mounted therein, comprising the steps of placing a strip of cellular elastomeric material between adjacent pins within certain segments of said mold cavity, introducing foamable rubber latex into one portion of said cavity as defined by said strip, introducing foamable rubber latex of a different density into the remaining portion of said cavity, vulcanizing said foamed latices while bonding said strip into a unitary foamed product, and maintaining separate identity of said latices and the foamed portions resulting therefrom by means of said strip.

3. The method of claim 2 in which said strip is latex foam rubber.

4. The method of claim 2 in which said strip is urethane foam.

References Cited

UNITED STATES PATENTS

| | | | |
|---|---|---|---|
| 2,150,287 | 3/1939 | Minor | 264—46 |
| 2,180,304 | 11/1939 | Minor | 264—46 X |
| 2,201,669 | 5/1940 | Kraft | 264—321 X |
| 2,320,425 | 6/1943 | Glaes et al. | 264—46 X |
| 2,432,353 | 12/1947 | Talalay | 264—54 X |
| 2,586,275 | 2/1952 | Toulmin | 264—46 |
| 3,020,587 | 2/1962 | Alderfer et al. | 264—46 |
| 3,028,610 | 4/1962 | Talalay | 264—41 X |
| 3,036,342 | 5/1962 | Fino | 264—45 |
| 3,161,436 | 12/1964 | Hood | 264—46 X |

FOREIGN PATENTS 373,781   6/1932   Great Britain.

JAMES A. SEIDLECK, *Primary Examiner.*

ROBERT F. WHITE, ALEXANDER F. BRODMERKEL, DONALD J. ARNOLD, *Examiners.*

P. E. ANDERSON, *Assistant Examiner.*